United States Patent
Zhao et al.

(10) Patent No.: US 6,553,225 B1
(45) Date of Patent: Apr. 22, 2003

(54) APPARATUS AND METHOD FOR POSITIONING SINGLE-OFFSET ZONES IN A SPOT BEAM COVERAGE AREA TO MAXIMIZE CALL DURATION IN A SATELLITE-BASED COMMUNICATIONS NETWORK

(76) Inventors: Wei Zhao, 19359 Circle Gate Dr., #303, Germantown, MD (US) 20874; David Roos, 21206 Little Sierra Ct., Boyds, MD (US) 20841

( * ) Notice: Subject to any disclaimer, the term of this patent is extended or adjusted under 35 U.S.C. 154(b) by 0 days.

(21) Appl. No.: 09/417,592

(22) Filed: Oct. 14, 1999

Related U.S. Application Data
(60) Provisional application No. 60/118,363, filed on Feb. 3, 1999.

(51) Int. Cl.[7] .................................................. H04Q 7/20
(52) U.S. Cl. ........................ 455/427; 455/429; 455/430; 455/12.1; 370/443; 370/348; 370/508
(58) Field of Search .................................... 455/427, 429, 455/430, 12.1; 370/443, 348, 508

(56) References Cited

U.S. PATENT DOCUMENTS

| | | |
|---|---|---|
| 5,245,634 A | 9/1993 | Averbuch |
| 5,307,399 A | 4/1994 | Dai et al. |
| 5,551,058 A | 8/1996 | Hutcheson et al. |
| 5,589,837 A | 12/1996 | Soleimani et al. |
| 5,630,016 A | 5/1997 | Swaminathan et al. |
| 5,678,228 A | 10/1997 | Soleimani et al. |
| 5,706,329 A | 1/1998 | Foladare et al. |
| 5,710,982 A | 1/1998 | Laborde et al. |
| 5,717,686 A | 2/1998 | Schiavoni |
| 5,745,524 A | 4/1998 | Hull |

(List continued on next page.)

FOREIGN PATENT DOCUMENTS

| | | |
|---|---|---|
| EP | 0046831 | 3/1982 |
| EP | 0162478 | 11/1985 |
| EP | 0748064 | 12/1985 |
| EP | 0475698 | 3/1992 |
| EP | 0506255 | 9/1992 |

(List continued on next page.)

OTHER PUBLICATIONS

US 5,415,368, 5/1995, Horstein et al. (withdrawn)
Fingerle et al., "GSM Signalisierung in der Praxis", ITG–Fachbericht, pp. 423–432, No. 124, Sep. 1993.

(List continued on next page.)

*Primary Examiner*—William Trost
*Assistant Examiner*—Danh Le

(57) ABSTRACT

An apparatus and method, for use in a satellite-based communications network, for positioning offset zones in a spot beam coverage area to maximize call duration. The apparatus and method employs a spot beam segregator and an offset zone arranger. The spot beam segregator segregates a coverage area of a spot beam generated by a satellite in the network into at least one offset zone based on respective propagation time periods required for signals to travel between the satellite and respective different locations in the coverage area. The offset zone arranger arranges each offset zone such that each respective center of each one offset zone overlaps a respective geographical location in the coverage area, with each respective geographic location having a respective access terminal density greater than any other geographical region within its respective offset zone. The burst offset to be assigned to each single-offset zone is then determined based on the propagation delay at each respective highest access terminal density region in the respective zones. Therefore, within each offset zone, the amount of access terminals whose guard time between bursts received and transmitted is optimized, and call duration is effectively maximized.

30 Claims, 6 Drawing Sheets

U.S. PATENT DOCUMENTS

| | | |
|---|---|---|
| 5,758,256 A | 5/1998 | Berry et al. |
| 5,794,160 A | 8/1998 | Ezuriko |
| 5,881,101 A | 3/1999 | Furman et al. |
| 5,920,284 A | 7/1999 | Victor |
| 5,940,753 A | 8/1999 | Mallinckrodt |
| 5,943,606 A | 8/1999 | Kremm et al. |
| 5,956,646 A | 9/1999 | Kolev et al. |
| 5,966,662 A | 10/1999 | Murto |
| 5,987,319 A | 11/1999 | Hermansson et al. |
| 5,991,642 A | 11/1999 | Watanabe et al. |
| 6,072,985 A * | 6/2000 | Wismer ............ 342/354 |
| 6,157,621 A * | 12/2000 | Brown et al. ........... 370/310 |
| 6,166,687 A * | 12/2000 | Ishikawa et al. ....... 342/357.16 |
| 6,332,069 B1 * | 12/2001 | Zhao et al. ............ 45/12.1 |

FOREIGN PATENT DOCUMENTS

| | | |
|---|---|---|
| EP | 0637142 | 2/1995 |
| EP | 0662758 | 7/1995 |
| EP | 0663736 | 7/1995 |
| EP | 0668667 | 8/1995 |
| EP | 0748064 | 12/1996 |
| JP | 4045617 | 2/1992 |
| WO | 8607512 | 12/1986 |
| WO | 9102436 | 2/1991 |
| WO | 9612352 | 4/1996 |
| WO | 9718650 | 5/1997 |
| WO | 9723065 | 6/1997 |
| WO | 9724891 | 7/1997 |
| WO | 9839857 | 9/1998 |

OTHER PUBLICATIONS

Garg et al., "Cost Effective Personal Communications Using Geo–Synchronous Satellite", 1996 IEEE International Conference on Personal Wireless Communications Proceedings and Exhibition—Future Access (CAT. No. 96TH8165), 1996.

Johnny N. Ku, "Strategies on the Immediate Assignment Procedure Within the GSM Call Setup Scenario", pp. 786–789, IEEE, 1992.

Annoni et al., "Access and Synchronization Schemes in the ESA OBP System", Countdown to the New Millennium, Phoenix, pp. 206–211, Dec. 2, 1991, IEEE.

* cited by examiner

APPARATUS AND METHOD FOR POSITIONING SINGLE-OFFSET ZONES IN A SPOT BEAM COVERAGE AREA TO MAXIMIZE CALL DURATION IN A SATELLITE-BASED COMMUNICATIONS NETWORK

CROSS-REFERENCE TO RELATED APPLICATIONS

Related subject matter is disclosed in a copending U.S. patent application of Wei Zhao, Steven Arnold, Anthony Noerpel and David Roos entitled "Apparatus and Method for Grouping Carriers to Minimize the Occurrence of Call Blocking in a Satellite-Based Communications Network", Ser. No. 09/244,970, filed on Feb. 10, 1999; and in a copending U.S. patent application of Chandra Joshi, Anthony Noerpel, Neeraj Tewari, Gerald Stelzer, David Roos and Chi-Jiun Su entitled "System and Method for Implementing Terminal to Terminal Connections via a Geosynchronous Earth Orbit Satellite", Ser. No. 09/115,098, filed on Jul. 13, 1998, the entire contents of each being expressly incorporated herein by reference.

This application claims the benefit under 35 U.S.C. §119 (e) of a U.S. provisional application of Wei Zhao and David Roos entitled "Offset Zone Arrangement Algorithm with Increased Call Duration", Ser. No. 60/118,363, filed on Feb. 3, 1999, the entire contents of which are incorporated by reference herein.

BACKGROUND OF THE INVENTION

1. Field of the Invention

The present invention relates to an apparatus and method, for use in a satellite-based communications network, for positioning single-offset zones in a spot beam coverage area to maximize call duration. More particularly, the present invention relates to an apparatus and method for maximizing call duration in a satellite-based communications network by segregating a spot beam coverage area into at least one single-offset zone, positioning the center of each respective single-offset zone to overlap a respective high user density area in the spot beam coverage area, and assigning to each single-offset zone a burst offset value based on propagation delay at its respective high user density area.

2. Description of the Related Art

A satellite communications network, such as a geosynchronous earth orbit mobile communications network, comprises at least one geosynchronous earth orbit satellite, a ground-based advanced operations center (AOC) and spacecraft operations center (SOC) associated with the satellite, at least one ground-based gateway station (GS), and at least one access terminal (AT), which is typically a hand-held or vehicle mounted mobile telephone. The satellite enables the access terminal to communicate with other access terminals, or with other telephones in the terrestrial public switched telephone network (PSTN), via the gateway stations under the control of the gateway stations. The AOC provides system-wide resource management and control functions for its respective satellite, and the SOC controls on-orbit satellite operations for its respective satellite.

To communicate with access terminals, the network controls a satellite to generate at least one spot beam, which is typically an L-band frequency signal, toward the surface of the earth. Each spot beam covers a predetermined geographic region of the earth, thus enabling access terminals within that region to communicate with the network via communications signals transmitted to the satellite over a carrier selected from a plurality of carriers assigned to the spot beam.

For example, when an access terminal places a call to another access terminal or to a terrestrial telephone, the access terminal generates and transmits a channel request message on a random access channel (RACH) at a frequency assigned to the spot beam to the satellite. Typically, a channel request message includes data representing a random number, which is used as an identifier for the access terminal sending the channel request message, as well as contention resolution and timing synchronization information.

The satellite includes a receiver which, under the control of the network, establishes time frames of a particular duration during which channel request messages are received. When a channel request message is received by the satellite during a particular time frame, and is thus received by the network, the network transmits data via the satellite to the access terminal to establish a communication link between the access terminal and network. The data includes access channel information (access grant channel information) indicating the frequencies of the carriers over which communication between the network and the access terminal is to occur during the call. Typically, a carrier of a particular frequency is assigned to service transmission of communications from the satellite to the access terminal, and a carrier of another frequency is assigned to service transmission of communications from the access terminal to the satellite. Hence, a pair of carriers service communication between the satellite and an access terminal.

Communication between the network and access terminal occurs in the form of signal bursts of a predetermined duration which are transmitted over the carrier pair designated by the access grant channel information between the access terminal and satellite. Signal bursts transmitted from the satellite to the access terminal, along with signal bursts being transmitted to other access terminals, if any, also assigned to a carrier in the carrier pair, are transmitted over the carrier in a time-division multiple access (TDMA) manner. That is, each signal burst being transmitted from the satellite to the access terminal is time-multiplexed with the signal bursts being transmitted by the satellite to the other access terminals in a TDMA frame of a particular duration, and transmitted over the carrier.

A TDMA frame includes a plurality of timeslots, which become occupied by the time-multiplexed signal bursts being transmitted. For example, a TDMA frame can include 24 timeslots, and each signal burst can be 3 timeslots long. Accordingly, a 24 timeslot TDMA frame can contain up to eight signal bursts which are being transmitted to eight respective access terminals (i.e., 8 signal bursts of 3 timeslots each), with each burst occupying three specific sequential timeslots of the TDMA frame. Naturally, a 24 timeslot TDMA frame can accommodate only four signal bursts which are each 6 timeslots in length, with each signal burst occupying six specific sequential timeslots of the TDMA frame.

Upon receiving its appropriate signal burst transmitted from the satellite, each access terminal transmits a signal burst back to the satellite in a TDMA frame over the other carrier in the carrier pair. An access terminal begins transmitting its respective signal burst at an appropriate instant in time after the instant in time at which the access terminal began receiving its respective signal burst transmitted from the satellite as described above. Because the transmitter/ receiver of an access terminal is a typically a half-diplexer which permits only signal transmission or signal reception at any given time, the time period in which the access terminal transmits a signal burst can not overlap the time period in which the access terminal is receiving a signal burst.

For example, in a typical TDMA based GEO mobile satellite system discussed above, each access terminal must separate its burst transmission and receive times by a certain time period, known as minimum guard time $T_{gt\ min}$, so that the half-diplexer can receive and transmit bursts properly. By insuring that sufficient guard time is provided, the "valid call duration" period for the access terminal, which is the time duration from call setup until blockage occurs, can be maximized.

An access terminal can attempt to comply with the minimum guard time requirement, and thus attempt to maximize valid call duration, by setting the timing separation between transmission and receive bursts to be longer than $T_{gt\ min}$ at the beginning of each call. However, during a call, it is common for the satellite and the access terminal to move relative to each other due to satellite diurnal motion and access terminal mobility. Due to this relative movement, the timing of the downlink and uplink bursts at the access terminal move relative to each other during a call, so that the access terminal eventually suffers from a shortage of Rx/Tx guard time.

To avoid call blockage, the system can perform a timeslot handover operation as known in the art, in which the blocked call is handed over from one timeslot to another. Although timeslot handover can be effective in minimizing call blocking, the hardware and software needed to perform the handover operations greatly complicates the system design and also requires additional signaling.

Another way to increase valid call duration is to properly select the satellite burst offset on per call basis, so that at any particular access terminal, the uplink burst has a maximum distance to both bursts received in the downlink (one earlier, one later), thus maximizing call duration. However, from traffic resource management point of view, it is preferable that a single satellite burst offset be shared by all access terminals in the coverage area supported by this single offset, which could be the entire spot beam coverage area or one offset zone from among a plurality of offset zones in a spot beam coverage area. As a result, this offset may result in a longer guard time for some access terminals on one side of the single offset zone, but a shorter guard time for some other access terminals on the opposite side of the offset zone.

Accordingly, a need exists for a system capable of increasing valid call duration without performing timeslot handover operations.

SUMMARY OF THE INVENTION

An object of the present invention is to provide an apparatus and method, for use in a satellite-based communications network, for increasing valid call duration in the network without performing timeslot handover operations.

Another object of the present invention is to provide an apparatus and method, for use in a satellite-based communications network, for positioning the offset zones in spot beam coverage area such that the center of each offset zone overlaps a respective area within the spot beam coverage area having high user density, to maximize call duration.

A further object of the present invention is to provide an apparatus and method for maximizing call duration in a satellite-based communications network by segregating a spot beam coverage area into at least one single-offset zone, positioning the center of each respective single-offset zone to overlap a respective high user density area in the spot beam coverage area, and assigning to each single-offset zone a burst offset value based on propagation delay at its respective high user density area.

These and other object of the present invention are substantially achieved by providing an apparatus and method for increasing call duration time in a satellite-based communications network, employing a spot beam segregator and an offset zone arranger. The spot beam segregator segregates a coverage area of a spot beam generated by a satellite in the network into at least one offset zone based on respective propagation time periods required for signals to travel between the satellite and respective different locations in the coverage area. The offset zone arranger arranges each offset zone such that each respective center of each one offset zone overlaps a respective geographical location in the coverage area, with each respective geographic location having a respective access terminal density greater than any other geographical region within its respective offset zone. Each offset zone is thus assigned a burst offset value based on propagation delay at its respective high user density area to maximize call duration.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
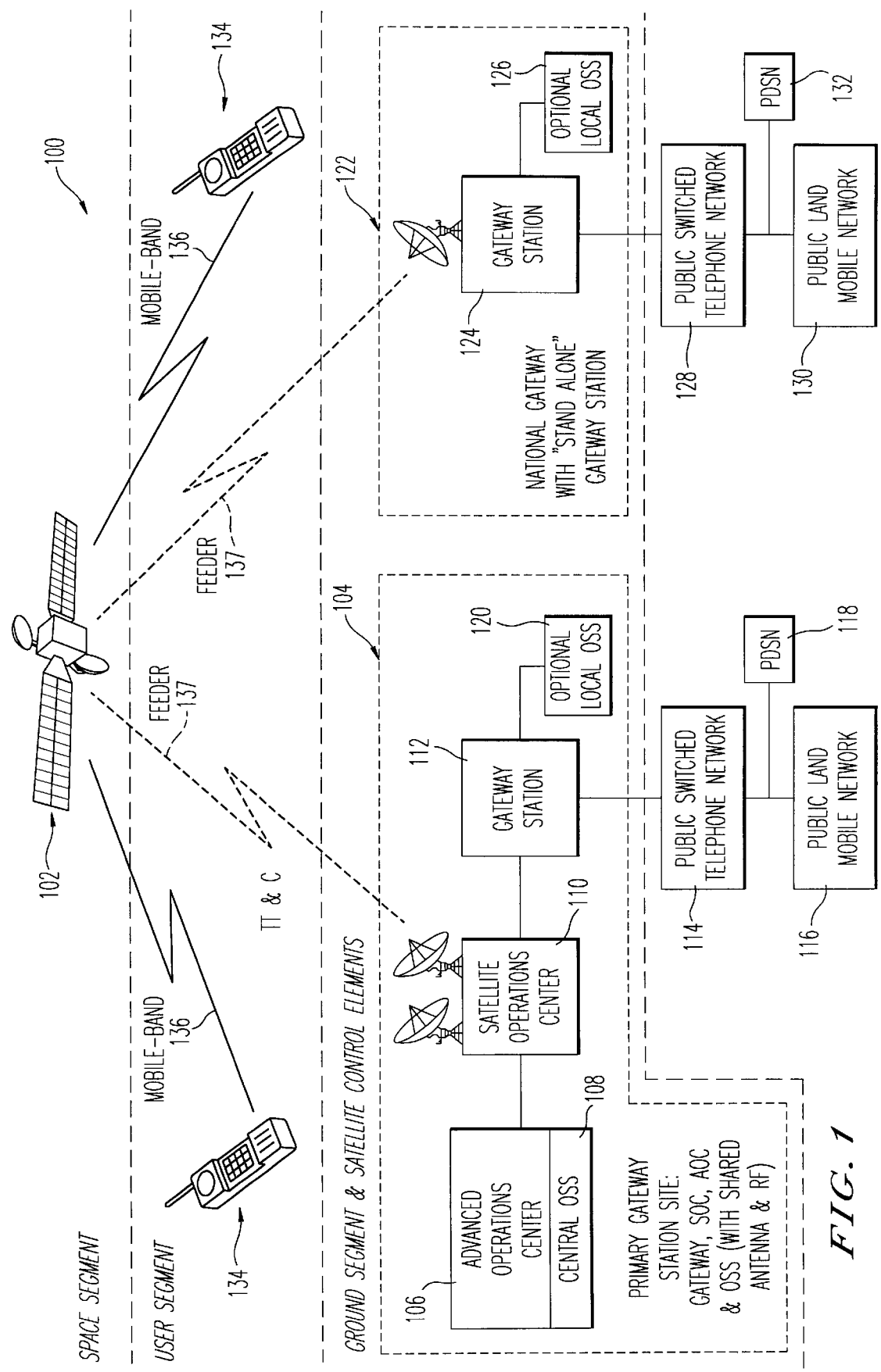
FIG. 1 is a schematic block diagram of a satellite communications network according to an embodiment of the present invention.

FIG. 1 illustrates an example of satellite communications network 100 according to an embodiment of the present invention. The satellite communications network includes at least one satellite 102 which is, for example, a geosynchronous earth orbit satellite, and at least one primary gateway station site 104. The primary gateway station site 104 comprises an advanced operations center (AOC) 106, a central operations support system (OSS) 108, a satellite operation center (SOC) 110, and a gateway station 112, which provides access to a public switched telephone network (PSTN) 114. The PSTN 114 provides access to the public land mobile network (PLMN) and public switched data network (PSDN) 118. Optionally, the gateway station 112 can include a local operations support system (LOSS) 120.

The network 100 also includes a national gateway 122 comprising a gateway station 124 which optionally includes a local OSS 126. The national gateway 122 provides access to a PSTN 128, which provides access to a PLMN 130 and a PSDN 132. Further details of the primary gateway station site 104 and national gateway station site 122 and their respective components and operations are set forth in copending U.S. patent application Ser. No. 09/115,098, referenced above.

Figure 2:
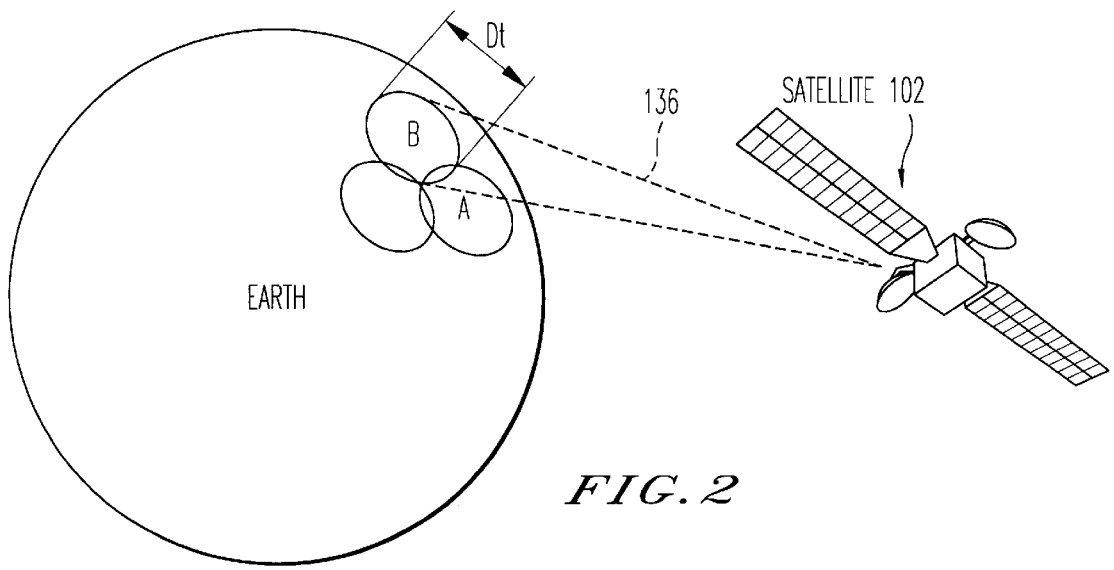
FIG. 2 is a schematic diagram illustrating a satellite in the satellite communications network shown in FIG. 1, projecting a plurality of spot beams onto different regions on the surface of the earth.

The satellite communications network 100 further includes at least one access terminal 134, such as a hand-held telephone or vehicle-mounted telephone, which can operate in the geosynchronous earth orbit satellite communications network 100 discussed above, as well as in a GSM cellular telephone network. As shown in FIG. 2, the satellite 102 generates at least one spot beam 136 onto a predetermined geographic location of the surface of the earth. In this example, the satellite 102 generates a plurality of spot beams 136 onto different respective geographic locations on the earth's surface. An access terminal 134 communicates with the satellite over, for example, an L-band frequency designated by a particular spot beam 136 covering an area of the earth at which the access terminal 134 is located. The primary gateway station 102 and national gateway station site 122 each communicate with the satellite 102 over, for example, a Ku-band frequency identified as feeder 137 in FIG. 1. Communications can be originated by an access terminal 134. Alternatively, a call can originate from a telephone serviced by, for example, a PSTN, or from a telephone serviced by a GSM cellular network. Details of the communication and control operations performed by the primary gateway station site 104 and national gateway station site 122 in relation to the satellite 102 and access terminal 134 to establish communication between two access terminals 134, or between an access terminal 134 and a terrestrial terminal such as a telephone serviced by a PSTN 114 or 128, are disclosed in U.S. patent application Ser. No. 09/115,098.

As discussed in the background section above, communication occurs between the network 100 and the access terminals 134 in the form of signal bursts which are transmitted in TDMA frames over carriers assigned to the spot beam 136 in which the access terminals 134 are located.

Figure 3:
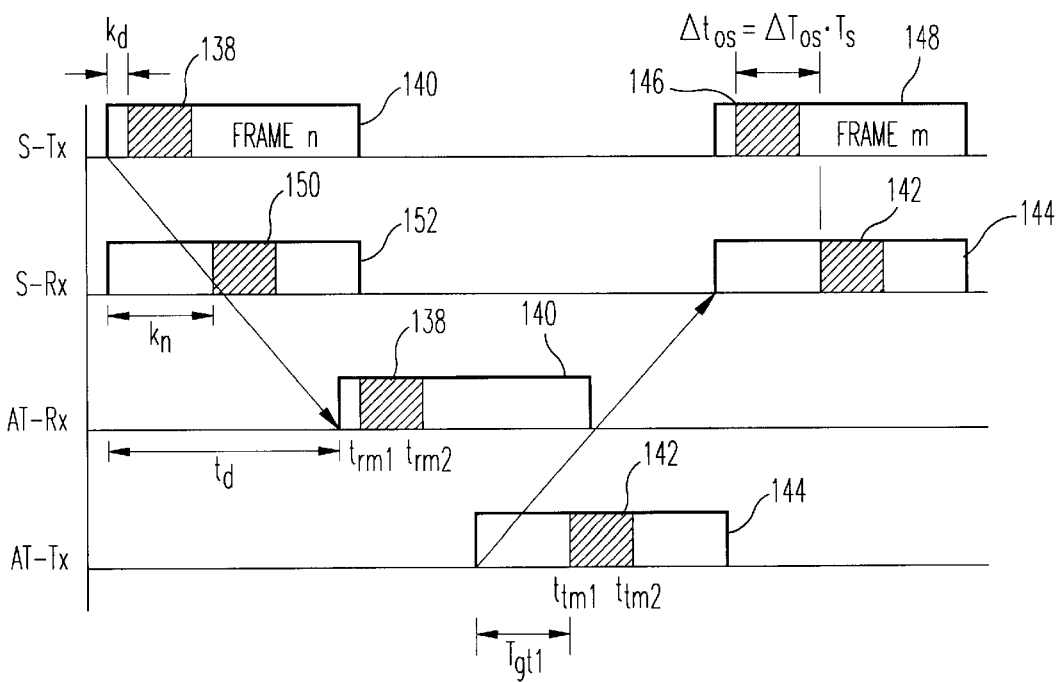
FIG. 3 is a timing diagram illustrating an example of the relationship between a signal burst being transmitted in a TDMA frame from a satellite to an access terminal over a carrier and a signal burst being transmitted in another TDMA frame from the access terminal to the satellite over another carrier.

FIG. 3 is a timing diagram illustrating an example of the relationship between a signal burst 138 being transmitted in a frame 140 from a satellite 102 to an access terminal 134 (see FIG. 1) over a carrier represented by S-Tx at the satellite (which is represented as AT-Rx at the access terminal), and a signal burst 142 being transmitted in another frame 144 from the access terminal 134 to the satellite 102 over another carrier represented by AT-Tx at the access terminal 134 (which is represented by S-Rx at the satellite 102).

In this example, the signal bursts are each 3-timeslots in duration, and each frame is 24-timeslots in duration. However, as discussed above, the signal bursts can have other durations, such as 6-timeframes, 9-timeframes, and so on, and the frames can have different durations as well. Additionally, FIG. 3 shows the time at which signal burst 138 in frame 140 is transmitted by the satellite 102 in relation to another signal burst 146 in frame 148 subsequently transmitted by the satellite 102. Also, the time at which signal burst 142 in frame 144 is received by the satellite 102 is shown in relation to another signal burst 150 in frame 152 which was previously received at the satellite 102. However, for clarity, the frames between frames 140 and 148, and the frames between frames 152 and 144, at the satellite (i.e., shown on carriers S-Tx and S-Rx) have been omitted.

As indicated, $t_d$ represents the propagation delay, in milliseconds, for frame 140 to travel from the satellite 102 to that particular access terminal 134 in accordance with the access terminal's location within the coverage area of the spot beam 136. The same propagation delay $t_d$ also occurs for frame 144 to travel from the access terminal 134 to the satellite 102. As described in more detail below, $k_d$ and $k_u$ represent the mobile downlink and uplink burst positions, respectively, of the signal bursts 138 and 150 in their respective frames 140 and 152. The downlink burst position $k_d$ is generally the same for all signal bursts being transmitted by satellite 102 to that particular access terminal 134. Similarly, the uplink burst position $k_u$ is generally the same for all signal bursts being received by the satellite 102 from that particular access terminal 134.

As also described in more detail below, $t_{rm1}$ and $t_{rm2}$ represent start time and stop time, respectively, of receipt of a signal burst (e.g., signal burst 138) by the access terminal 134. Similarly, $t_{tm1}$ and $t_{tm2}$ represent start time and stop time, respectively, of transmission of a signal burst (e.g., signal burst 142) by the access terminal 134. The term $\Delta t_{os}$ represents the receiving/transmitting burst offset at the satellite 102 in units of milliseconds, $\Delta T_{os}$ represents the receiving/transmitting burst offset measured in timeslots of a frame, and $T_s$ represents the timeslot duration in milliseconds.

For illustrative purposes, FIG. 3 shows frame 140 as including only one signal burst 138. However, as discussed in the background section above, a plurality of access terminals (e.g., up to 8 access terminals) can be assigned to communicate with the satellite 102 over the same carriers (e.g., the carriers represented as S-Tx and S-Rx at the satellite 102). In this event, signal burst 138 being transmitted from the satellite 102 to the access terminal 134, is time-multiplexed with the other signal bursts being transmitted to other access terminals in frame 140 as described, for example, in U.S. patent application Ser. No. 09/244,970 referenced above.

As discussed in the background section above, relative movement between an access terminal 134 and the satellite 102 can change the relative timing between receipt of a downlink transmission burst and transmission of an uplink transmission burst, thus resulting in call blocking. This relative movement can cause an uplink transmission burst to collide with a downlink burst in two different ways.

As can be appreciated by one skilled in the art, if the access terminal 134 and the satellite 102 are moving away from each other, the access terminal 134 must delay its burst reception time and advance its burst transmission time. Therefore, the timing at which transmission bursts are transmitted eventually conflicts the timing at which the subsequent received bursts are received. On the other hand, if the access terminal 134 and the satellite 102 are moving toward each other, the access terminal 134 must advance its burst reception time and delay its burst transmission time. Therefore, the timing at which transmission bursts are transmitted eventually conflicts with the timing at which the previous received bursts are received.

Figure 4A:
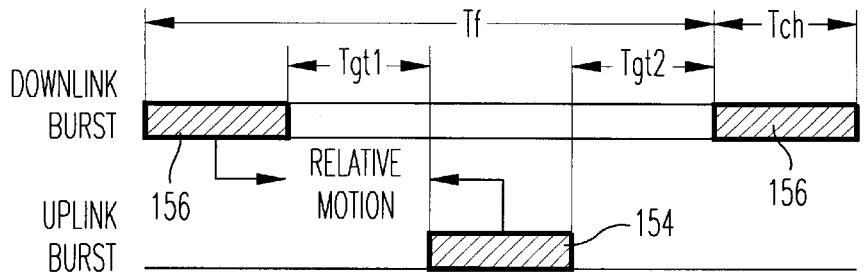
FIG. 4A illustrates a timing diagram showing the transmission time of a burst transmitted by an access terminal in relation to the receipt time of bursts received by the access terminal with maximum guard time between the transmitted and received bursts.

Without taking into account specifics concerning the satellite constellation, collision between the transmitted and received bursts at the access terminal 134 can be avoided by providing equal guard time between an uplink burst 154 and the two downlink bursts 156 on both sides of the uplink burst as shown, for example, in FIG. 4A, where $T_f$ is the frame duration, $T_{ch}$ is the burst duration, $T_{gt}$ is the guard time duration. To achieve this burst timing relationship for each call, the forward/return burst offset on the satellite 102 must be calculated on per call basis, since the propagation delay varies from call to call.

Figure 4B:
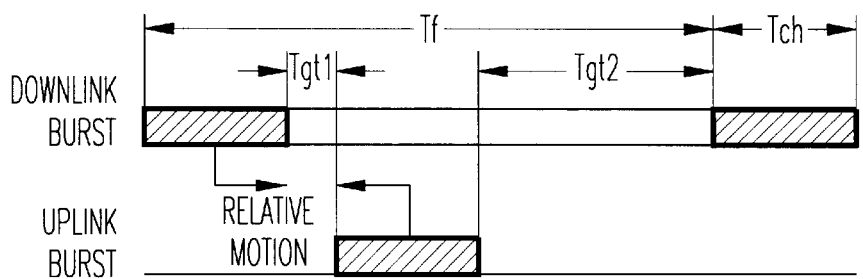
FIG. 4B illustrates a timing diagram showing the transmission time of a burst transmitted by an access terminal in relation to the receipt time of bursts received by the access terminal with decreased guard time between the transmitted burst and one of the received bursts.

However, efficient traffic resource utilization requires that the same satellite burst offset be applied to a large number of access terminals 134 at different geographical locations. As a result, the timing arrangement shown in FIG. 4A generally cannot be applied to all access terminals 134. Therefore, as a practical matter, the uplink and downlink bursts 154 and 156 at some access terminals 134 will have the relationship shown in FIG. 4B. As indicated, the initial guard time will be much smaller than the optimum guard time. Therefore, if the access terminal 134 and satellite 102 move away from each other, the two Rx/Tx bursts (with guard time $T_{gt1}$) will be become closer and closer, and the valid call duration will be greatly reduced due to guard time shortage.

In order to increase the valid call duration by eliminating or at least minimize the occurrence of call blocking due to guard time shortage, the apparatus and method of the present invention divides a spot beam coverage area into at least one single offset zone, and overlaps the center of each single offset zone with a respective geographical location having the highest mobile user density. By doing this, most of the calls originated from the offset zone have maximized Rx/Tx burst guard time at the time of call setup. Accordingly, the guard time arrangement shown in FIG. 4A can be achieved by the access terminals 134 at the location with the highest access terminal density in a single offset zone. With this arrangement, most of the access terminals 134 will have an optimized guard time at the time of call setup. Therefore, statistically speaking, calls in which guard time shortage may occur can be reduced.

Figure 5:
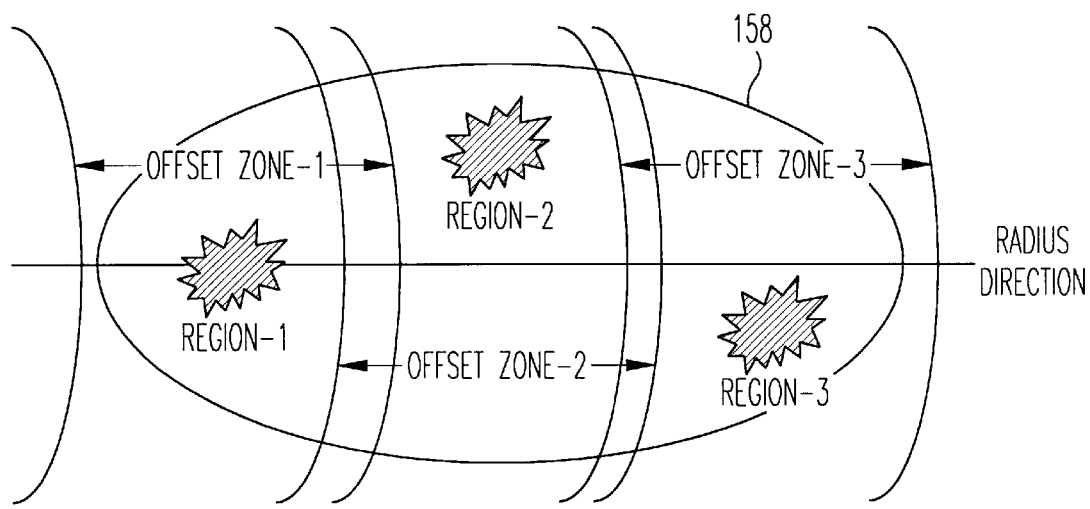
FIG. 5 is a diagram illustrating an example of a spot beam generated by a satellite in the network shown in FIG. 1, which is being segregated into a plurality of offset zones in accordance with an embodiment of the apparatus and method of the present invention.

In the example shown in FIG. 5, an embodiment of the present invention segregates the coverage area 158 of a spot beam 136 into three offset zones Offset zone-1 through Offset zone-3, as indicated, for reasons discussed below. Each of the offset zones Offset zone-1 through Offset zone-3 is assigned a respective single burst offset as described in more detail below. It is noted that neighboring offset zones overlap each other by a certain amount to avoid an abrupt change in the offset due to the relative motion between the satellite 102 and the access terminal 134 (e.g., if the access terminal 134 is moving). Further details surrounding the operations for segregating coverage area 158 can be found in U.S. patent application Ser. No. 09/244,970. Also, although only three offset zones are shown, the embodiment of the invention can segregate the coverage area 158 into any practical number of offset zones, as described in U.S. patent application Ser. No. 09/244,970 referenced above.

The processes performed for segregating the coverage area, positioning the single-offset zone or zones, and assigning the burst offset for each single-offset zone or zones are carried out in this example by a computer in a traffic control subsystem (TCS) in the gateway station assigned to the access terminal 134 placing the call. For example, if an access terminal 134 is at a location assigned to the primary gateway station site 104, the processing is performed by a computer in the TCS in gateway station 112. However, if an access terminal 134 is at a location assigned to national gateway station site 122, the processing is performed by a computer in the TCS in gateway station 124.

As will now be exemplified, the segregating, single-offset zone positioning and offset burst assigning operations are accomplished in accordance with the equations set forth below. In this example, it is assumed that the access terminal 134 is at a location assigned to the primary gateway station site 104 and thus, processing is performed by a computer in the TCS in gateway station 112.

As can be appreciated by one skilled in the art, the access terminal burst guard time is a function of user propagation delay $t_d$, and satellite burst offset $\Delta T_{os}$. The burst offset is defined as the difference between forward link burst position and return link burst position, in number of timeslots.

Specifically, the burst offset has the following features. Each burst offset has a fixed coverage zone on the ground, called a single offset zone. Within any single offset zone, the same burst offset can be shared by all users with different propagation delay. Location of a single offset zone is determined by its offset value. Therefore an offset zone can be placed in anywhere within a satellite or spot beam coverage. Also, within any single offset zone, a change in position of an access terminal 134 (therefore a change in propagation delay) results in a change in Rx/Tx guard time.

Referring to FIG. 3, the duration of any frame (e.g., frame 140) is $T_f$ in milliseconds, and each frame has $N_s$ timeslots, with $N_s=T_f/T_s$. Each signal burst (e.g., signal burst 138) lasts for a duration of K timeslots. Accordingly, a signal burst length is represented by $T_{ch}=K \cdot T_s$ in milliseconds, where K is a constant number for all traffic in the system.

In addition, as discussed above, $k_d$ and $k_u$ represent the mobile downlink and uplink burst positions, respectively, which range from 0 to $N_s-1$ in a frame. Also, $t_{rm1}$ and $t_{rm2}$ represent start time and stop time, respectively, of receipt of signal burst 138 by the access terminal 134. Similarly, $t_{tm1}$ and $t_{tm2}$ represent start time and stop time, respectively, of transmission of signal burst 142 by the access terminal 134. The term $\Delta t_{os}$ represents the receiving/transmitting burst offset at the satellite 102, and $\Delta T_{os}$ represents the receiving/transmitting burst offset measured in timeslots of a frame. As also mentioned in the background section above, a time period in which a signal burst is transmitted by an access terminal 134 can not overlap a time period in which a signal burst is received by that access terminal 134. Furthermore, a guard time of $T_{gt1}$ (in milliseconds) must be present with the signal bursts to permit the access terminal 134 to switch between transmitting and receiving modes.

Before being able to determine the number of offset zones into which the coverage area 158 should be divided, the processing being performed determines the maximum round-trip delay variation $R_z$ that will be permitted for each offset zone. The maximum round-trip delay variation means the maximum permissible difference in round-trip delay time between the access terminal in the offset zone having the smallest round-trip propagation delay time and the access terminal in the offset zone having the largest round-trip propagation delay time or, in other words, the maximum difference in round-trip propagation delay which would be experienced by access terminals at opposite ends of the offset zone.

In accordance with the present invention, the processing determines the maximum round trip delay variation $R_z$ based on the frame length $T_f$, the signal burst length $T_{ch}$, and the guard time $T_{gt}$. Specifically, the maximum round trip delay variation $R_z$ is determined in milliseconds according to the following equation:

$$R_z = T_f - 2(T_{ch} + T_{gt})$$

As will now be described, this equation is derived in accordance with such factors as the durations of the time frames, signal bursts and burst offset, as well as the position of the signal burst within their respective time frames, and the propagation delay between an access terminal (e.g., access terminal 134) and the satellite 102. As shown in FIG. 3, for exemplary purposes, the position of transmission frame 140 at the satellite is designated as frame n, and the position of receiving frame 144 at the satellite is designated as frame m. In this example, the difference between n and m is equal to "7" (i.e., seven frames). However, the difference between n and m can be set at any suitable integer value.

For purposes of the following equations, it will be assumed that frame n is the starting frame. However, the starting frame number has no consequence on the final results of the calculations. For a given terminal position with propagation delay $t_d$, if the reception/transmission burst offset at the satellite is $\Delta t_{os} = \Delta T_{os} \cdot T_s$, where $\Delta T_{os}$ is the offset measured in timeslots, and $T_s$ is the timeslot duration measured in ms, then the start time $t_{tm1}$ of the transmission burst at the terminal can be given by $$t_{tm1} = (m-n)T_f + k_d T_s - t_d + \Delta t_{os}.$$

Therefore the propagation delay $t_d$ is a function of the transmission time $t_{tm1}$:

$$t_d = (m-n)T_f + k_d T_s + \Delta t_{os} - t_{tm1}$$

In order to meet the guard time requirements of the access terminal 134 which affords the access terminal 134 sufficient time to switch between the receiving and transmitting modes, enough guard time $T_{gt}$ must exist on both sides the signal burst (e.g., signal burst 142) being transmitted from the terminal 134. Assuming a single burst offset at the satellite 102 can support propagation delays in the range of $[t_{dz\ min}, t_{dz\ max}]$, then the range of $t_{tm1}$ can be given by the equations:

$$t_{tm1\ min} \leq t_{tm1} \leq t_{tm1\ max}$$

$$t_{tm1\ min} = t_{dz\ max} + k_d T_s + T_{ch} + T_{gt}$$

$$t_{tm1\ max} = t_{dz\ min} + T_f + k_d T_s - T_{ch} - T_{gt}$$

where $T_{ch}$ and $T_{gt}$ are the traffic burst duration and guard time duration, both measured in ms. Furthermore, because $$t_{dz\ max} = (m-n)T_f + k_d T_s + \Delta t_{os} - t_{tm1\ min}$$

$$t_{dz\ min} = (m-n)T_f + k_d T_s + \Delta t_{os} - t_{tm1\ max}$$

then in accordance with the above equations for $t_{tm1\ min}$ and $t_{tm1\ max}$, these equations become:

$$2t_{dz\ max} = (m-n)T_f + \Delta t_{os} - T_{ch} - T_{gt}$$

$$2t_{dz\ min} = (m-n)T_f + \Delta t_{os} + T_{ch} + T_{gt} - T_f$$

If it is then assumed that $R_z$ is the range of the equal offset zone measured in terms of the round trip delay variation, then $$R_z = 2(t_{dz\ max} - t_{dz\ min}) = T_f - 2(T_{ch} + T_{gt})$$

as indicated above.

The processing performed in accordance with the present invention then assumes that an offset zone has a coverage range of $[t_{d\ min}, t_{d\ max}]$, and $R_z = 2(t_{d\ max} - t_{d\ min})$. The value of the satellite burst offset $\Delta T_{os}$ assigned to an offset zone is a function of $t_{d0}$, which represents the propagation delay at the offset zone's center. For a GEO satellite system, $\Delta T_{os}$ is calculated as $$\Delta T_{os} = \text{round}\left(\frac{2t_{d0} - 6.5 T_f}{T_s}\right)$$

$$t_{d0} = \frac{t_{d\max} + t_{d\min}}{2}$$

with the unit of $\Delta T_{os}$ being in number of timeslots.

The above value of the satellite burst offset $\Delta T_{os}$ is derived in accordance with the following. First, the position of each offset zone is determined. Then, the offset is calculated based on the propagation delay in the offset zone center.

Assuming that $t_{d0}$ is the propagation delay from the satellite to the center of the single offset zone, and $[t_{d\ min}, t_{d\ max}]$ is the offset zone delay boundary, then $$t_{d0} = [t_{d\ min} + t_{d\ max}]/2$$

If the satellite burst offset corresponding to the considered offset zone is $\Delta t_{os}$ in ms, then $$\Delta t_{os} = 2t_{d0} - \frac{2(m-n) - 1}{2} T_f$$

To achieve frame/timeslot synchronization on the satellite, the offset $\Delta t_{os}$ must be an integer of a timeslot duration. Then $\Delta T_{os}$, which is the burst offset in number of timeslots, can be given as:

$$\Delta T_{os} = \text{round}\left[\left(2t_{d0} - \frac{2(m-n) - 1}{2} T_f\right)/T_s\right]$$

with the operation round(x) taking the nearest integer around x. For a geo-stationary satellite constellation according to this example, m−n=7. Therefore $$\Delta T_{os} = \text{round}[(2t_{d0} - 6.5 T_f)/T_s]$$

as indicated above.

Based on the above equations and as demonstrated below, it can be appreciated by one skilled in the art that the optimized position of an access terminal 134 in a single offset zone to achieve optimized guard time as shown in FIG. 4A is around the mid-delay point of the single offset zone. Specifically, referring to FIG. 3 and assuming that the starting frame number is n for a given terminal position with propagation delay $t_d$, if the Rx/Tx burst offset at the satellite is $\Delta t_{os} = \Delta T_{os} \cdot T_s$, then the receive burst boundaries from frame-n are $$t_{rm1} = t_d + k_d T_s$$

$$t_{rm2} = t_d + k_d T_s + T_{ch}$$

After receiving a burst from frame-n, the next immediate transmission burst boundaries to frame-m are $$t_{tm1} = (m-n)T_f + k_d T_s - t_d + \Delta t_{os}$$

$$t_{tm1} = (m-n)T_f + k_d T_s - t_d + \Delta t_{os} + T_{ch}$$

At the access terminal 134, forward/return link burst guard time $T_{gt1}$ and $T_{gt2}$ can be given as $$T_{gt1} = t_{tm1} - t_{rm2} = (m-n)T_f + (k_u - k_d)T_s - 2t_d - T_{ch}$$

$$T_{gt2} = t_{rm1} + T_f - t_{tm2} = (1 - m + n)T_f - (k_u - k_d)T_s + 2t_d - T_{ch}$$

Since $$\Delta T_{os} = k_u - k_d$$

then $$T_{gt1} = t_{tm1} - t_{rm2} = (m-n)T_f + \Delta T_{os} \cdot T_s - 2t_d - T_{ch}$$

$$T_{gt2} = t_{rm1} + T_f - t_{tm2} = (1 - m + n)T_f - \Delta T_{os} \cdot T_s + 2t_d - T_{ch}$$

To achieve the optimized guard time arrangement, at the call setup stage, the following condition should be met:

$$T_{gt1} = T_{gt2}$$

Taking the above into account, while also considering the fact that m−n=7 for a GEO satellite system in this example, the following condition is satisfied:

$$\frac{2t_d - 6.5T_f}{T_s} = \text{round}\left(\frac{2t_d - 6.5T_f}{T_s}\right)$$

with the term "round" meaning to round up or down to the nearest integer. For example, round(4.49) equals 4, while round(4.5) equals 5.

Considering the following:

if $A = \text{round}(B)$ then $B - \frac{1}{2} \leq A \leq B + \frac{1}{2}$ then $$t_{d0} - \frac{T_s}{4} \leq t_d \leq t_{d0} + \frac{T_s}{4}$$

Figure 6:
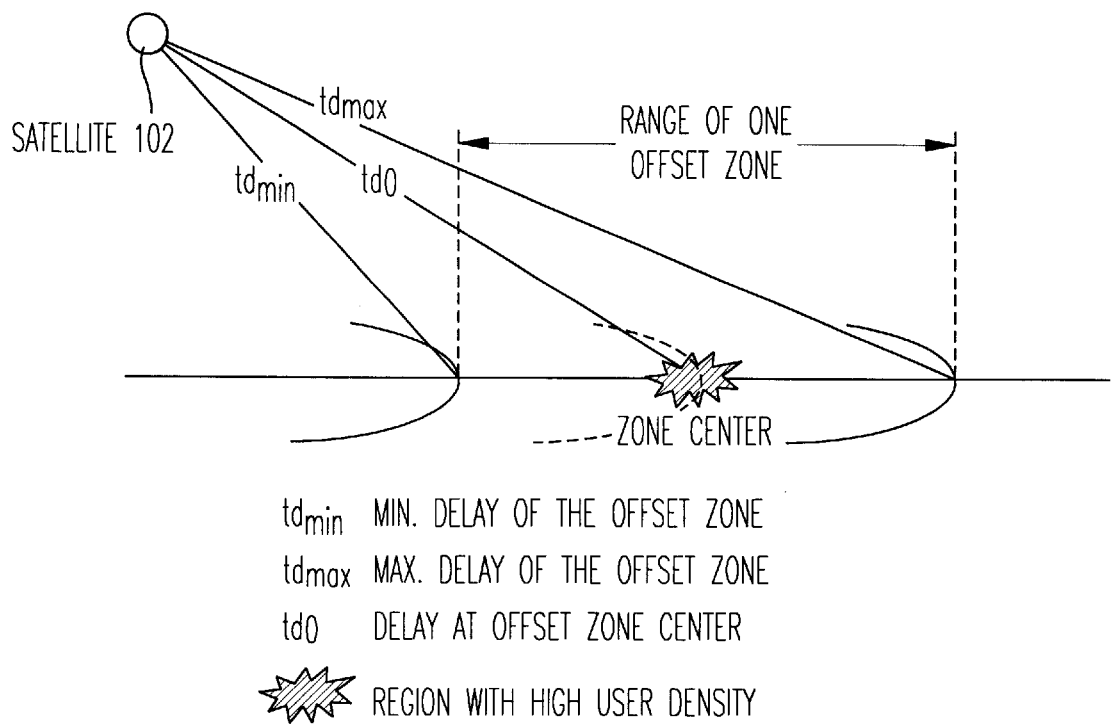
FIG. 6 is a diagram illustrating propagation delay times in relation to locations within a single offset zone set in FIG. 5.

Accordingly, as can be appreciated from the above, an access terminal 134 located in a single-offset zone achieves optimum guard time when positioned at the center of that single-offset zone where the propagation delay is $t_{d0}$, as shown in FIG. 6. This propagation delay $t_{d0}$ also is the propagation delay used for the satellite burst offset calculation for that single-offset zone.

Therefore, if the processing positions the center of each single-offset zone in a spot beam coverage area 158 to overlap with a respective high user density region, and the satellite burst offset for each respective single-offset zone is calculated based on the propagation delay at the high user density region in each respective single-offset zone, the valid call duration can be greatly increased for most of the calls originating from any single-offset zone. In other words, the processing positions the center of Offset zone-1 to overlap the region within the Offset zone-1 coverage area having the highest access terminal density (i.e., the most users per square area). Similarly, the processing positions the center of Offset zone-2 to overlap the region within the Offset zone-2 coverage area having the highest access terminal density, and so on.

In addition, the processing calculates the respective satellite burst offset assigned to each single-offset zone based on the propagation delay at the respective highest access terminal density region in each respective single-offset zone. In other words, the processing calculates the satellite burst offset to be assigned to access terminals 134 in Offset zone-1 based on the propagation delay at the respective highest access terminal density region within the Offset-1 coverage area. Similarly, the processing calculates the satellite burst offset to be assigned to access terminals 134 in Offset zone-2 based on the propagation delay at the respective highest access terminal density region within the Offset zone-2 coverage area, and so on.

As can be appreciated from the above, prior to the network being able to position the centers of the single offsets zones based on access terminal density, the access terminal density D must be evaluated. The access terminal density D can be evaluated as a function of propagation delay $t_d$: $D(t_d)$. This evaluation can be performed within each spot beam (if the timeslot assignment is on beam coverage basis), or within the whole satellite coverage (if the timeslot assignment is on satellite coverage basis).

The position at which the center of any single-offset zone is determined by examining the variation of access terminal density $D(t_d)$. The peak access terminal density gives the location of an offset zone center in terms of the propagation delay. Also, due to the large delay variations in some spot beams, more than one offset zone may be needed to cover the whole range of the beam coverage area 158. In this event, the processing segregates the beam coverage area 158 into multiple single offset zones as described above and as shown in FIG. 5, for example. In this event, the processing must therefore identify the appropriate location for the center of each single-offset zone.

As discussed above, the value of offset corresponding to each offset zone is calculated based on the equation:

$$\Delta T_{os} = \text{round}\left(\frac{2t_{d0} - 6.5T_f}{T_s}\right)$$

$$t_{d0} = \frac{t_{dmax} + t_{dmin}}{2}$$

with the offset zone center delay $t_{d0}$ for a particular offset zone being the propagation delay at the center of the high user density region in that offset zone. The coverage range for each offset zone $[t_{d\ min}, t_{d\ max}]$ is therefore calculated based on the following equations:

$$t_{dmin} = t_{d0} - \frac{R_z}{4}$$

$$t_{dmax} = t_{d0} + \frac{R_z}{4}$$

The processing is therefore able to determine from which offset zone a call was made based on the propagation delay of the access terminal 134 placing the call, in order to determine the appropriate satellite burst offset to be assigned to that access terminal 134. For example, when an access terminal 134 in spot beam coverage area 158 places a call, the propagation delay $t_d$ for the access terminal is compared to the propagation delay range of each offset zone. If $t_d$ falls into the range of the kth offset zone, that is, $t_{d\,min}(k) \leq t_d \leq t_{d\,max}(k)$ then the processing assigns offset $\Delta T_{os}(k)$ in the timeslot assignment for this call.

WORKING EXAMPLE

A simulation has been performed for one offset zone in a GEO mobile satellite system. For a given traffic loading and fixed access terminal geographical distribution, the valid call duration was simulated with two different offset zone arrangement scenarios. In the first, the offset zone center is centered at the region with the highest access terminal density. In the second, the offset zone center is positioned away from the high access terminal density region by 0.5 ms in one way differential delay. For most of the access terminals, the timing figure will be similar to that shown in FIG. 4B, where Tgt1<Tgt2.

The conditions used in the simulation are as follows: Frame duration is $T_f$=4 ms, Timeslot duration is $T_s$=1.67 ms, Number of timeslots in one frame is 24, and each traffic burst has 9 contiguous timeslots. The minimum guard time required by the access terminal is $T_{gt\,min}$=1.5$T_s$=2.5 ms, and the satellite has an inclination angle of 6.28 degree. Mobile access terminal velocity has a uniform distribution, within a range of [0, 160] km/hr. Distribution of the access terminal moving direction is also uniform, within a range of [0, 360] degrees on the ground.

The simulation was performed over 24 hrs, so that the satellite experiences a complete cycle in its orbit. With 30 erlang traffic loading and 120 seconds average call duration, the number of calls simulated in 24 hrs is about 21600. To simulate the non-uniform mobile access terminal distribution, call setup delay is assumed to have a normal distribution, with a mean of 125 ms, and standard deviation of 0.3 ms. With optimized offset zone arrangement, the offset value is calculated using the 125 ms as zone center delay. With non-optimized offset zone arrangement, 125.5 ms is used for offset calculation.

Figure 7:
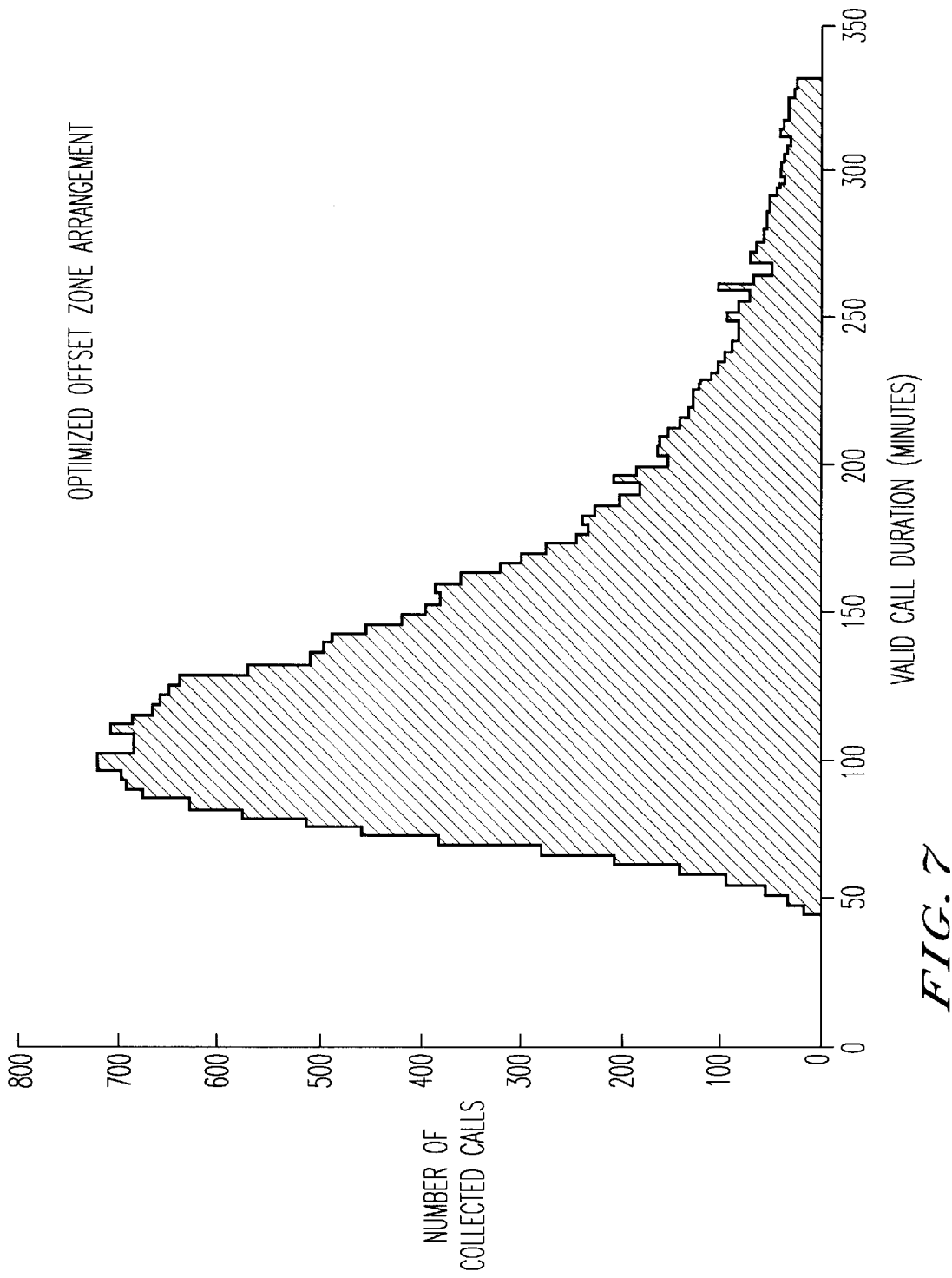
FIG. 7 is a bar graph illustrating a simulation of the number of connected calls versus valid call duration when the centers of the offset zones shown in FIG. 5 are positioned to overlap locations having maximum access terminal density according to an embodiment of the present invention.
Figure 8:
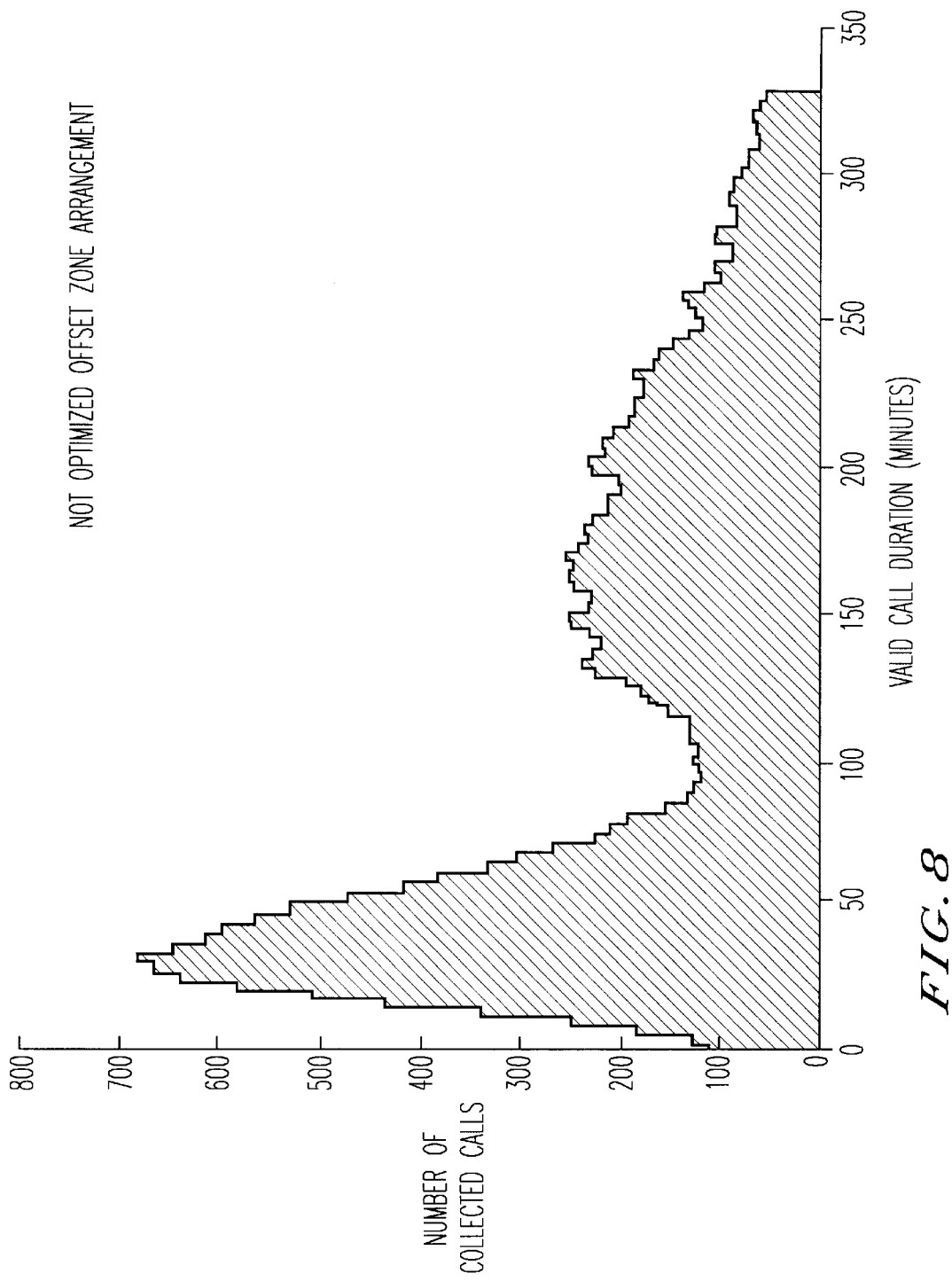
FIG. 8 is a bar graph illustrating a simulation of the number of connected calls versus valid call duration when the centers of the offset zones shown in FIG. 5 are positioned to overlap locations other than those having maximum access terminal density.

Both simulation results are shown in the charts of FIGS. 7 and 8. FIG. 7 illustrates the valid call duration for optimized offset zone arrangement according to the present invention, while FIG. 8 illustrates the valid call duration for the non-optimized offset zone arrangement. As can be appreciated for FIG. 7, if offset zone center is overlapped with high density region, very few calls will be blocked before 50 minutes after call setup. This is more than enough for most user applications.

On the contrary, as can be appreciated from FIG. 8, after shifting the offset zone center from the high density region by 0.5 ms, calls fall into two different groups. In the first group, the valid call duration is significantly reduced compared with optimized case. For these calls, at the time of call setup, the satellite is moving in such a direction that valid call duration must be determined by the reduced guard time Tgt1 (see FIG. 4B). It can also be seen that some calls are blocked only several minutes after call setup. In the second group, the valid call duration is increased in comparison with the optimized case. However, since very few applications require a link connection up to several hundred minutes, this increased duration is not deemed to provide any practical advantage.

In summary, the embodiment of the present invention described above provides an efficient mechanism for increasing call duration in a TDMA based GEO mobile satellite system. The embodiment also avoids the use of complex signaling procedures associated with timeslot handover operations, and thus introduces little or no additional cost to the network. Also, the embodiment is especially effective in improving the satellite coverage to a region in which the user traffic distribution varies significantly from location to location within the region.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus for increasing call duration time in a satellite-based communications network, comprising:

a spot beam segregator, adapted to segregate a coverage area of a spot beam generated by a satellite in said network into at least one offset zone based on respective propagation time periods required for signals to travel between said satellite and respective different locations in said coverage area; and an offset zone arranger, adapted to arrange each of said at least one offset zone such that each respective center of each of said at least one offset zone overlaps a respective geographical location in said coverage area, each said respective geographic location having a respective access terminal density greater than any other geographical region within its respective offset zone.

2. An apparatus as claimed in claim 1, further comprising:
   a burst offset calculator, adapted to calculate a burst offset in accordance with which bursts are received and transmitted by all access terminals in a said offset zone, based on a respective propagation delay period required for a signal to travel between said satellite and said respective geographic location within the said offset zone.

3. An apparatus as claimed in claim 1, further comprising:
   an access terminal locator, adapted to determine in which of said at least one offset zone an access terminal resides based on a propagation delay time required for a signal transmitted from said access terminal to reach said satellite; and
   a burst offset assignor which, based on the offset zone in which said access terminal resides as determined by said access terminal locator, assigns to said access terminal a burst offset time in accordance with which burst are received and transmitted by said access terminal.

4. An apparatus as claimed in claim 1, wherein:
   said spot beam segregator segregates said coverage area into a plurality of offset zones; and
   said offset zone arranger overlaps each respective center of each of said plurality of offset zones with a said respective geographical location in said coverage area.

5. An apparatus as claimed in claim 1, wherein:
   said spot beam segregator segregates said coverage area into a plurality of offset zones, such that each said offset zone includes a portion of at least one adjacent offset zone.

6. An apparatus as claimed in claim 1, wherein said spot beam segregator is adapted to segregate said coverage area of said spot beam generated by said satellite which is a geo-synchronous satellite.

7. An apparatus for increasing call duration time in a satellite-based communications network including a satellite which generates a spot beam to form a spot beam coverage area which enables access terminals therein to communicate with said network, comprising:
   an access terminal density determining apparatus, adapted to identify a location in at least one zone of said spot beam coverage area having a number of access terminals greater than any other location in said zone; and
   a burst offset time assigning apparatus which is adapted to assign, based on a propagation delay of a signal propagating from said location to said satellite, a burst offset time in accordance with which burst are received and transmitted by every access terminal in said zone.

8. An apparatus as claimed in claim 7, wherein:
   said access terminal density determining apparatus is adapted to identify a respective said location in each of a plurality of zones of said spot beam coverage area, each said respective location having a number of access terminals greater than any other location in its respective zone; and
   said burst offset time assigning apparatus is adapted to assign a respective said burst offset time for each of said zones based on a respective propagation delay at each of their respective locations.

9. An apparatus as claimed in claim 7, further comprising:
   an access terminal locator, adapted to determine in which of said at least one zone an access terminal resides based on a propagation delay time required for a signal transmitted from said access terminal to reach said satellite; and
   wherein said burst offset time assigning apparatus assigns to said access terminal a said burst offset time based on the zone in which said access terminal resides as determined by said access terminal locator.

10. An apparatus as claimed in claim 7, wherein said satellite is a geo-synchronous satellite which generates said spot beam to form said spot beam coverage area; and
   said access terminal density determining apparatus is adapted to identify said location in said at least one zone at said spot beam coverage area found by said spot beam generated by said geo-synchronous satellite.

11. A method for increasing call duration time in a satellite-based communications network, comprising the steps of:
   segregating a coverage area of a spot beam generated by a satellite in said network into at least one offset zone based on respective propagation time periods required for signals to travel between said satellite and respective different locations in said coverage area; and
   arranging each of said at least one offset zone such that each respective center of each of said at least one offset zone overlaps a respective geographical location in said coverage area, each said respective geographic location having a respective access terminal density greater than any other geographical region within its respective offset zone.

12. A method as claimed in claim 11, further comprising the step of:
   calculating a burst offset in accordance with which bursts are received and transmitted by all access terminals in a said offset zone, based on a respective propagation delay period required for a signal to travel between said satellite and said respective geographic location within the said offset zone.

13. A method as claimed in claim 11, further comprising the steps of:
   determining in which of said at least one offset zone an access terminal resides based on a propagation delay time required for a signal transmitted from said access terminal to reach said satellite; and
   assigning to said access terminal, based on the offset zone in which said access terminal resides as determined by said determining step, a burst offset time in accordance with which burst are received and transmitted by said access terminal.

14. A method as claimed in claim 11, wherein:
   said segregating step segregates said coverage area into a plurality of offset zones; and
   said arranging step overlaps each respective center of each of said plurality of offset zones with a said respective geographical location in said coverage area.

15. A method as claimed in claim 11, wherein:
   said segregating step segregates said coverage area into a plurality of offset zones, such that each said offset zone includes a portion of at least one adjacent offset zone.

16. A method as claimed in claim 11 wherein said segregating step segregates said coverage area of said spot beam generated by said satellite which is a geo-synchronous satellite.

17. A method for increasing call duration time in a satellite-based communications network including a satellite which generates a spot beam to form a spot beam coverage area which enables access terminals therein to communicate with said network, comprising the steps of:
   identifying a location in at least one zone of said spot beam coverage area having a number of access terminals greater than any other location in said zone; and
   assigning a burst offset time in accordance with which burst are received and transmitted by every access terminal in said zone based on a propagation delay of a signal propagating from said location to said satellite.

18. A method as claimed in claim 17, wherein:
   said identifying step identifies a respective said location in each of a plurality of zones of said spot beam coverage area, each said respective location having a number of access terminals greater than any other location in its respective zone; and
   said assigning step assigns a respective said burst offset time for each of said zones based on a respective propagation delay at each of their respective locations.

19. A method as claimed in claim 17, further comprising the steps of:
   determining in which of said at least one zone an access terminal resides based on a propagation delay time required for a signal transmitted from said access terminal to reach said satellite; and
   wherein said assigning step assigns to said access terminal a said burst offset time based on the zone in which said access terminal resides as determined by said determining step.

20. A method as claimed in claim 17, wherein:
   said satellite is a geo-synchronous satellite that generates said spot beam to form said spot beam coverage area; and
   said identifying step identifies said location in said at least one zone of said spot beam coverage area formed by said spot beam generated by said geo-synchronous satellite.

21. A computer readable medium of instructions for increasing call duration time in a satellite-based communications network, comprising:

a first set of instructions, adapted to control said network to segregate a coverage area of a spot beam generated by a satellite in said network into at least one offset zone based on respective propagation time periods required for signals to travel between said satellite and respective different locations in said coverage area; and a second set of instructions, adapted to control said network to arrange each of said at least one offset zone such that each respective center of each of said at least one offset zone overlaps a respective geographical location in said coverage area, each said respective geographic location having a respective access terminal density greater than any other geographical region within its respective offset zone.

22. A computer readable medium of instructions as claimed in claim 21, further comprising:

a third set of instructions, adapted to control said network to calculate a burst offset in accordance with which bursts are received and transmitted by all access terminals in a said offset zone, based on a respective propagation delay period required for a signal to travel between said satellite and said respective geographic location within the said offset zone.

23. A computer readable medium of instructions as claimed in claim 21, further comprising:

a fourth set of instructions, adapted to control said network to determine in which of said at least one offset zone an access terminal resides based on a propagation delay time required for a signal transmitted from said access terminal to reach said satellite; and a fifth set of instructions, adapted to control said network to assign to said access terminal, based on the offset zone in which said access terminal resides as determined in accordance with said fourth set of instructions, a burst offset time in accordance with which burst are received and transmitted by said access terminal.

24. A computer readable medium of instructions as claimed in claim 21, wherein:

said first set of instructions is adapted to control said network to segregate said coverage area into a plurality of offset zones; and said second set of instructions is adapted to control said network to overlap each respective center of each of said plurality of offset zones with a said respective geographical location in said coverage area.

25. A computer readable medium of instructions as claimed in claim 21, wherein:

said first set of instructions is adapted to control said network to segregate said coverage area into a plurality of offset zones, such that each said offset zone includes a portion of at least one adjacent offset zone.

26. A computer readable medium as claimed in claim 21, wherein said coverage area of said spot beam generated by said satellite is a geo-synchronous satellite.

27. A computer readable medium of instructions for increasing call duration time in a satellite-based communications network including a satellite which generates a spot beam to form a spot beam coverage area which enables access terminals therein to communicate with said network, comprising:

a first set of instructions, adapted to control said network to identify a location in at least one zone of said spot beam coverage area having a number of access terminals greater than any other location in said zone; and a second set of instructions, adapted to control said network to assign a burst offset time in accordance with which burst are received and transmitted by every access terminal in said zone based on a propagation delay of a signal propagating from said location to said satellite.

28. A computer readable medium of instructions as claimed in claim 27, wherein:

said first set of instructions is adapted to control said network to identify a respective said location in each of a plurality of zones of said spot beam coverage area, each said respective location having a number of access terminals greater than any other location in its respective zone; and said second set of instructions is adapted to control said network to assign a respective said burst offset time for each of said zones based on a respective propagation delay at each of their respective locations.

29. A computer readable medium of instructions as claimed in claim 27, further comprising:

a third set of instructions, adapted to control said network to determine in which of said at least one zone an access terminal resides based on a propagation delay time required for a signal transmitted from said access terminal to reach said satellite; and wherein said second set of instructions is adapted to control said network to assign to said access terminal a said burst offset time based on the zone in which said access terminal resides as determined by said third set of instructions.

30. A computer readable medium as claimed in claim 27, wherein:

said satellite is a geo-synchronous satellite which generates said spot beam to form said spot beam coverage area, and said network is adapted to identify said location in said at least one zone at said spot beam coverage area found by said spot beam generated by said geo-synchronous satellite.

* * * * *

UNITED STATES PATENT AND TRADEMARK OFFICE
CERTIFICATE OF CORRECTION

PATENT NO. : 6,553,225 B1  Page 1 of 1
DATED : April 22, 2003
INVENTOR(S) : Wei Zhao et al It is certified that error appears in the above-identified patent and that said Letters Patent is hereby corrected as shown below:

<u>Title page,</u>
Item [73], should read -- Assignee: Hughes Electronics Corporation, El Segundo, CA --
Insert Item:
-- [74] *Attorney, Agent, or Firm* - John T. Whelan; Michael W. Sales --

Signed and Sealed this

Second Day of September, 2003

JAMES E. ROGAN
*Director of the United States Patent and Trademark Office*